(12) United States Patent
Gan et al.

(10) Patent No.: US 8,725,194 B2
(45) Date of Patent: May 13, 2014

(54) GROUPING USER TERMINALS INTO DIFFERENT COORDINATION SCHEME GROUPS

(75) Inventors: Jiansong Gan, Beijing (CN); Muhammad Kazmi, Bromma (SE); Jingyi Liao, Beijing (CN); Qingyu Miao, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 480 days.

(21) Appl. No.: 13/000,657

(22) PCT Filed: Jun. 30, 2008

(86) PCT No.: PCT/SE2008/050800
§ 371 (c)(1),
(2), (4) Date: Dec. 22, 2010

(87) PCT Pub. No.: WO2010/002297
PCT Pub. Date: Jan. 7, 2010

(65) Prior Publication Data
US 2011/0105170 A1    May 5, 2011

(51) Int. Cl.
*H04B 7/00*    (2006.01)

(52) U.S. Cl.
USPC ........ 455/524; 455/500; 455/509; 455/426.1; 455/67.11; 455/453; 370/310; 370/328; 370/329; 370/334; 370/338

(58) Field of Classification Search
USPC ......... 455/524, 500, 517, 518, 519, 507, 514, 455/445, 422.1, 403, 550.1, 509, 453, 455/67.11, 426.1, 426.2, 522, 69; 370/310, 370/328, 329, 334, 338
See application file for complete search history.

(56) References Cited

U.S. PATENT DOCUMENTS

| | | | | |
|---|---|---|---|---|
| 8,169,931 B2 * | 5/2012 | Hui et al. | | 370/252 |
| 2008/0144493 A1 | 6/2008 | Yeh | | |
| 2008/0268834 A1 | 10/2008 | Foschini et al. | | |
| 2009/0111473 A1 * | 4/2009 | Tao et al. | | 455/440 |
| 2010/0020702 A1 * | 1/2010 | Wong et al. | | 370/252 |

FOREIGN PATENT DOCUMENTS

WO    2007/117468 A2    10/2007

OTHER PUBLICATIONS

Zhao, J. et al. "Distributed Coordination in Dynamic Spectrum Allocation Networks." 2005 1st IEEE International Symposium on New Frontiers in Dynamic Spectrum Access Networks, Nov. 8-11, 2005.

* cited by examiner

*Primary Examiner* — Keith Ferguson
(74) *Attorney, Agent, or Firm* — Coats & Bennett, PLLC

(57) ABSTRACT

In a radio network in which multiple base stations can communicate with multiple user terminals in a coordinated way, user terminals may be grouped into groups, each group representing a coordination scheme to be used for user terminals in the group. The groups may be chosen, for example, according to path loss or QoS requirements Preferably there are three groups requiring no coordination, multiuser coherent coordination and single user coherent coordination respectively. Grouping may be done dynamically according to one or more of the following factors: —the terminal's signalling overhead—the affordable processing complexity—the traffic load—the radio conditions. The grouping unit may be placed in one or more base stations or in any other suitable unit in the network.

24 Claims, 2 Drawing Sheets

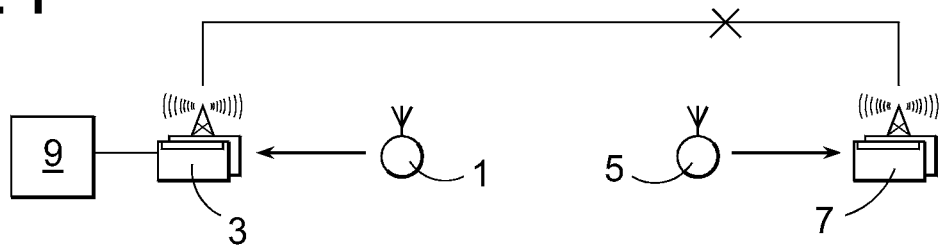
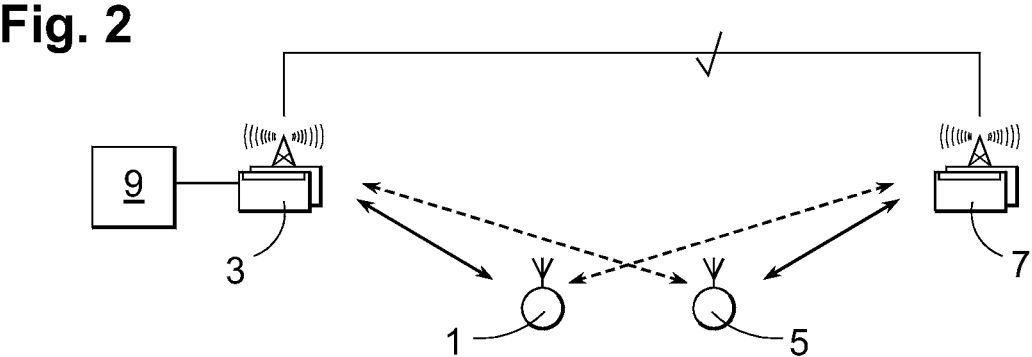
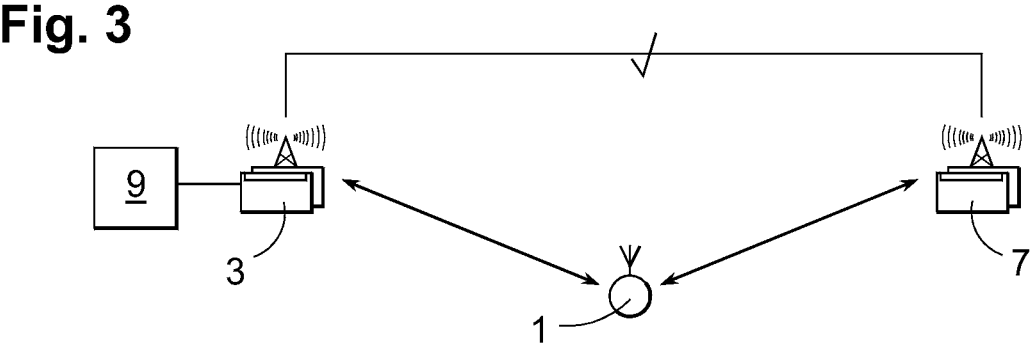

Fig. 4
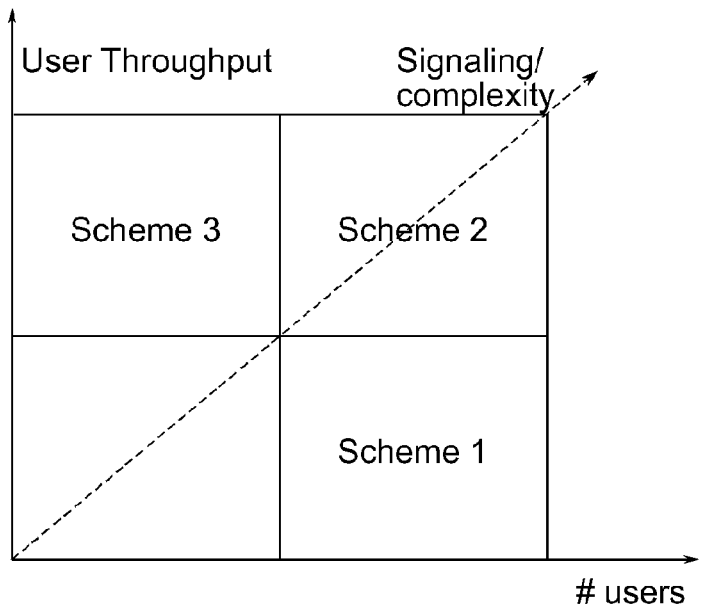
Fig. 5
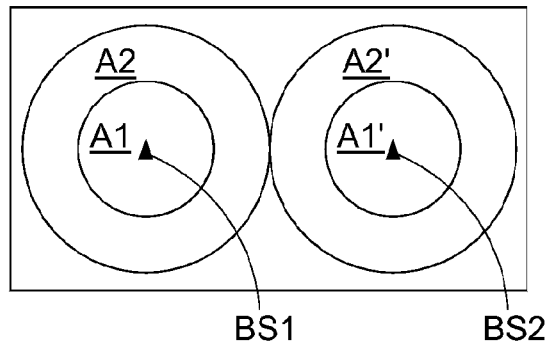
Fig. 6
| | High traffic<br>High affordable<br>complexity | High traffic<br>Low affordable<br>complexity | Low traffic |
|---|---|---|---|
| Frequency | A13 | A13' | A13" |
| | | | A12" |
| | A12 | | |
| | | | A11" |
| | | A12' | |
| | A11 | A11' | |

GROUPING USER TERMINALS INTO DIFFERENT COORDINATION SCHEME GROUPS

TECHNICAL FIELD

The present invention relates to allocation of communication resources in radio communications networks, in particular, in networks employing coordination from multiple base stations to the same user terminal.

BACKGROUND

Most conventional wireless communication systems employ the so-called cellular architecture. In this architecture, the coverage area is divided into multiple cells, and users in different cell are served by different base stations. Traditionally, each user communicates only with its serving base station. Signal to/from other base stations are treated as interference.

As base stations are connected to each other with high-speed cables or optical fibers, it is possible to coordinate the transmission and reception of these base stations. In this alternative arrangement with extensive inter-base station coordination, the inter-cell interference can be greatly reduced and system performance can be improved. This is the concept of Coordinated Multi-Point (CoMP) transmission/reception, which was shown to provide tremendous performance gain compared with that without coordination. G. J. Foschini et al., "The value of coherent base station coordination," in Proceedings of the 39th Annual Conference on Information Sciences and Systems (CISS '05), March 2005 discusses the use of coherent base stations coordination.

Despite some similarities, this kind of coordination should not be confused with traditional MIMO systems. In the latter setup multiple antennas are used for transmission one or more data streams to the user from the same base station site. In the former scenario (i.e. CoMP or DAS) the user receives or transmits from/to multiple base station sites in a well coordinated fashion. Hence although MU coherent coordination schemes in CoMP have the similar principle to MU-MIMO techniques in a traditional cellular system, schemes for these two types of system differ from each other due to different channel conditions of these two systems.

US Patent applications 2007/0223422 and 2007/0223423 disclose a method for scheduling users in a MIMO system. Users are divided into two groups: one for users that may be scheduled together and one for users that are to be scheduled individually.

To explore the benefit of coordination between multiple sites, different methods have been proposed.

One kind of scheme that extensively investigated is coherently coordinated multi-user transmission/reception (MU coherent coordination for short). With this kind of scheme, a system with multiple sites can be treated in a similar way as a network MIMO system. Then techniques similar to traditional MU-MIMO techniques can be applied for both uplink and downlink in this CoMP system. Note that different terminology is used for this type of network arrangement e.g. distributed antenna system (DAS) is another well known term. However they all correspond to similar concept in which transmission and reception from different base station sites are coordinated. In the uplink, MMSE or MMSE-SIC, can be applied to eliminate inter-user interference. Similarly in the downlink, potential inter-user interference can be suppressed before transmission with techniques like ZF beamforming or ZF beamforming with dirty paper coding.

Besides this coherently coordinated multi-user transmission/reception, it is also possible to use other kinds of coordination schemes. These schemes may be categorized into the following two major types:

Coherently coordinated single-user transmission/reception (SU coherent coordination for short):
In these schemes multiple sites jointly serve one user with techniques like beamforming or transmit/receiving diversity. With such schemes, the SNR or BER performance of the severed user is improved.

Non-coherently coordinated transmission/reception (non-coherent coordination for short):
This type of scheme is similar to the idea of inter-cell interference coordination (ICIC) between multiple sites, which may be non-coherent or asynchronous.

Multi-User (MU) coherent coordination may lead to significant gain compared with that without coordination. However, this kind of coordination requires Channel State Information (CSI) or other relevant downlink quality metric at the network for downlink transmission. This leads to increased uplink signaling overheads as well as increased processing complexity at UEs in average. For uplink transmissions, the complexity at the receiver side is also quite high.

SUMMARY

It is an object of the present invention to optimize the performance of a wireless communication system using coherently coordinated multi-user transmission/reception.

Embodiments herein include a system that simultaneously supports multiple coordination schemes in a system with multiple coordinated base station sites for transmission and reception. A dynamic user-grouping method is proposed where users are divided into different groups based on affordable signaling overhead, processing complexity, traffic load and radio conditions. The same coordination scheme is used for serving users belonging to the same group, while different schemes are used for different groups of users. Different groups are assigned orthogonal physical radio resources, and users in different groups use different method for transmission and reception.

Embodiments herein thus include a system that is designed and dimensioned to support coordination of all users in the system. In a typical scenario there is no need to have full scale coordination for all users. If MU coherent coordination is used for all users, it will result in increased cost, complexity and signaling overheads. System complexity can be reduced by introducing different schemes and choosing a suitable scheme for each user in a coordinated way. For example, SU coherent coordination or non-coherent coordination schemes may result in some performance loss, but may nevertheless be suitable for some users.

Embodiments herein advantageously reduce system complexity considerably, since full coordination (MU coherent coordination) is required only for a sub-set of users. More specifically this leads to the following benefits: reduction in signaling overheads compared to the scenario, which requires full coordination, reduction in overall delay and also reduction in overall processing at the base stations. Thus by the virtue of the invention the DAS system can be implemented with relatively less hardware and signaling capacity, which in turn will reduce the network cost.

Another advantage is that when users are far from sites, SU coherent coordination can help to increase their SNR, hence their QoS can be better satisfied and the system coverage can be improved.

ABBREVIATIONS

UE: User Equipment
MU: Multi User
SU: Single User
CSI: Channel State Information
RRM: Radio Resource Management
SNR: Signal-to-Noise Ratio
CoMP: Coordinated Multi-Point
QoS: Quality of Service
ICIC: Inter-Cell Interference Coordination
MIMO: Multiple-Input Multiple-Output
ZF: Zero Forcing
MMSE: Minimum Mean-Square Error
RB: Resource Block
SIC: Successive Interference Cancellation
SDMA: Space Division Multiple Access

BRIEF DESCRIPTION OF THE DRAWINGS

The invention will described in more detail in the following, with reference to the appended drawings, in which FIG. 1 illustrates a scheme with no coordination between users FIG. 2 illustrates a scheme with multi-user coherent coordination FIG. 3 illustrates a scheme with single user coherent coordination FIG. 4 illustrates the properties of three different schemes FIG. 5 illustrates an embodiment for selection of schemes FIG. 6 illustrates an example of a dynamic user grouping scheme

DETAILED DESCRIPTION

According to various embodiments herein, at least two different coordination schemes are provided in the cellular network. Three such coordination schemes will be discussed below, in connection with FIGS. 1, 2 and 3, respectively.

FIG. 1 illustrates a scheme where there is no coordination between users. A first user 1 communicates with a first base station 3 and a second user 5 communicates with a second base station 7. There is no coordination between the base stations 3, 7, as is indicated by the crossed-over connection between them. Consequently, each user transmits independently and treats signal from other users as interference. This scheme is preferably used for users which are close to base stations. Due to small path loss, a user terminal 1, 5 that is close to the base station will transmit with a low power level. The low user terminal transmit power level causes less interference to the neighboring base stations 3, 7. Similarly in the downlink the user terminal 1, 5 itself experiences less interference since base stations 3, 7 are able to operate at low power level for such user terminals.

There is a grouping unit 9, which in FIG. 1 is shown connected to one of the base stations 3. This grouping unit 9 comprises software for performing the inventive functions related to grouping users together. If the network comprises a coordination centre arranged to coordinate the base stations, the grouping unit can be placed in the coordination centre. Otherwise, each base station may have its own grouping unit. These grouping unit needs information exchange between each other so as to work. Alternatively, one of the base stations 3, 7 may be designated as the master base station, which is responsible for coordination. This means all requests are sent to the master base station, which comprises or is connected to the grouping unit 9. The grouping unit 9 of one base station then coordinates the communication for all base stations.

In yet another alternative embodiment, several or all base stations have grouping units associated with them and each terminal has a terminal-specific master base station, called an anchor. The master base station is decided at call setup and possibly again at handover. In the latter case when terminal is handed over to a new cell then new anchor base station is assigned to terminal.

In the scheme shown in FIG. 1, multiple users can be supported simultaneously with low signaling overhead, as no signaling is needed to coordinate the base stations. In addition, due to lack of coordination effort the processing complexity is significantly reduced. Furthermore, no extra delay for coordination is needed due to independent scheduling at each base station. However, due to potential inter-user interference, the Quality of Service (QoS) may be low when interference is high.

FIG. 2 illustrates a scheme for multi-user coherent coordination. As in FIG. 1, a first user terminal 1 communicates with a first base station 3 and a second user terminal 5 communicates with a second base station 7. The first user terminal 1 also communicates with the second base station 7 and the second user terminal 5 also communicates with the first base station 3. The communication between each base station and a specific user terminal 1, 5, is coordinated, as is indicated by the connection between the base stations 3, 7.

As illustrated in FIG. 2, multiple users transmit simultaneously. The inter-user interference can be suppressed with signal processing techniques and a certain Quality of Service (QoS) is guaranteed for each user. However, high processing complexity and signaling overhead are needed for MU coherent coordination. In addition, this scheme should not be used when the signal strength is low, as MIMO techniques always work in high-SNR regime.

FIG. 3 illustrates a scheme using single user coherent coordination. A single user terminal 1 communicates with two base stations 3, 7. As illustrated in FIG. 3, on each resource block (frequency-time resource), only the single user 1 is supported and antenna diversity schemes like beamforming or transmit/receiver diversity can be applied. Hence the throughput of this user is increased compared with serving it with only one BS. However, fewer users can be supported compared with the two previous schemes, no coordination and MU coherent coordination, respectively.

The term resource block (RB) used in the present invention stands for a physical time-frequency resource in OFDMA. Typically more than one resource block is allocated for data transmission. In E-UTRAN one resource block comprises of 12 sub-carriers each with a carrier spacing of 15 kHz over 0.5 ms time duration i.e. 1 RB=180 kHz×0.5 ms.

The three coordination schemes discussed in connection with FIGS. 1-3 have different properties and will be advantageous for different users. FIG. 4 shows a comparison between the three schemes in terms of number of supported users (shown along the horizontal axis), user throughput (along the vertical axis) and signaling/complexity (along the diagonal line). As can be seen, scheme 1, in the lower right corner, will typically have lower user throughput as users with scheme 1 may suffer from interference. However, when users are close to their respective serving site, the throughput loss due to interference is not large. The advantages of scheme 1 are low signaling overhead, low complexity and a large number of supported users.

Users with scheme 2, shown in the upper right corner, may have higher user throughput. However, this scheme requires high signaling overhead and high complexity. Moreover, when users are very far from their serving sites, the receive SNR may be quite low, which makes scheme 2 work less well. Users with scheme 3, in the upper left corner, have high user throughput, however fewer users can be supported simultaneously compared with scheme 1 and scheme 2. Hence scheme 3 will be used only when a user is far from any sites but still requires a certain QoS.

In a preferred embodiment of the invention, the user grouping scheme is made dynamic.

FIG. 5 illustrates, by way of example, a system with two sites BS1, BS2, each covering an equilateral rectangular area. For a certain QoS requirement, schemes for different positions may have a pattern similar to what is shown in FIG. 5.

According to FIG. 5, users with small path loss or good signal strength/quality (with respect to their respective serving base station) tend to choose non-coordination scheme. These are typically the users that are close to their serving base station BS1, BS2. This includes the users in the areas denoted A1 and A1', around the respective base station BS1, BS2. On the other hand users with medium path loss would choose MU coherent coordination scheme. This includes the users in a circular area around each of the areas A2 and A2', respectively. Finally, users far away from their base stations, that is, outside of the areas A2 and A2', respectively, would probably choose SU coherent coordination to keep SNR above a certain level.

A user grouping scheme according to one embodiment works as follows:

First, all users in a system are divided into three Scheme Groups, named SG1, SG2 and SG3 based on affordable signaling overhead, processing complexity, traffic load and radio conditions. Users in SG1 use non-coordination scheme, users in SG2 use MU coherent coordination scheme, while users in SG3 use SU coherent coordination scheme. Users in the different scheme groups use different sets of resource blocks so they do not interfere with each other.

Users in the same SG can be further divided into several Access Groups. Users in the same access group access the same set of resource blocks with the same transmission scheme. For users in the third scheme group SG3, each access group contains only one user. For the other scheme groups SG1 and SG2, each access group may contain more than one user.

User grouping as described in point 1 may change dynamically based on one or more factors, for example one or more of the following:
the terminal's signalling overhead
the network's signalling overhead
the affordable processing complexity
the traffic load
the required QoS
the radio condition.

The radio condition in turn may be determined according to one or more of the following criteria:
the required transmission power level
the path loss between the user terminal and the nearest base station or a number of the nearest base stations
the terminal reported channel state information
the uplink received interference level.

Also, the number of users allocated to each of the scheme group can be changed dynamically in dependence of the situation in the network. FIG. 6 illustrates an example of how users may be grouped and regrouped as a function of various parameters and factors: complexity, signaling load, traffic load etc. For each column, the lower area A11, A11', A11" represents the users in group 3, that is, the users requiring single-user coherent coordination. The middle area A12, A12', A12" represents the users in group 2, that is, the users requiring multi-user coherent coordination. The uppermost area A13, A13', A13" represents the users in group 1, that is, the users that are to have no coordination.

In the left column of FIG. 6, the traffic load is assumed to be high and higher complexity is affordable. In this case the majority of the users may be allocated to the group of MU coherent coordination, illustrated by a large middle area A12. The lower and uppermost areas A11, A13 are smaller reflecting a smaller number of users in these groups.

In the middle column, the affordable complexity/signaling are assumed to be low. In this case more users can be allocated to non-coordination group, illustrated by a large uppermost area A12". The lower and middle areas A11', A12' are smaller, reflecting a smaller number of users in these groups.

When traffic load becomes lower, as is assumed in the right column of FIG. 6, more users can be allocated to the SU coherent coordination group, and the QoS of each user can be increased. This is illustrated by a large lower area A11". The lower and middle areas A12", A13" are smaller, reflecting a smaller number of users in these groups.

The invention claimed is:

1. A grouping circuit comprised in a radio communications network, the radio communications network comprising a plurality of base stations configured to communicate with a plurality of user terminals in a coordinated way using connections between the base stations, said grouping circuit configured to group at least some of the user terminals into different coordination scheme groups, the different coordination scheme groups being assigned different coordination schemes in which the base stations coordinate with one another in different ways for communicating with the grouped user terminals, wherein each base station communicates with a user terminal belonging to a particular group using the coordination scheme assigned to that group.

2. The grouping circuit according to claim 1, configured to group the at least some of the user terminals by assigning a user terminal to one of the coordination scheme groups in accordance with at least one of:
the terminal's signalling overhead;
the network's signalling overhead;
an affordable processing complexity;
a traffic load;
a required Quality of Service (QoS); and
a radio condition.

3. The grouping circuit according to claim 2, configured to assign a user terminal to one of the coordination scheme groups in accordance with at least said radio condition, and to determine said radio condition according to one or more of:
a required transmission power level;
a path loss between the user terminal and at least one closest base station;
a terminal reported channel state information; and
an uplink received interference level.

4. The grouping circuit according to claim 1, configured to dynamically group the at least some of the user terminals.

5. The grouping circuit according to claim 1, configured to group the at least some of the user terminals into different coordination scheme groups in terms of the required coordination that include a first group requiring multiuser coherent coordination and a second group requiring single user coherent coordination.

6. The grouping circuit according to claim 5, further configured to group the at least some of the user terminals in any given one of the first and second coordination scheme groups into different access groups, each access group comprising one or more user terminals that are to access or be assigned the same set of physical resources.

7. The grouping circuit according to claim 5, further configured to group others of the user terminals into a non-coordination scheme group in which the base stations do not coordinate with one another for communicating with the user terminals in that group.

8. The grouping circuit according to claim 7, further configured to group the user terminals in any given one of the different coordination scheme groups or the non-coordination scheme group into different access groups, each access group comprising one or more user terminals that are to access or be assigned the same set of physical resources, wherein the grouping circuit is configured to form each access group to contain only one user terminal if that user terminal belongs to the non-coordination scheme group and to contain one or more users if those one or more users belong to one of the coordination scheme groups.

9. The grouping circuit according to claim 7, configured to form the non-coordination scheme group from user terminals having strong radio conditions with respect to one of the base stations as defined by a strong radio condition threshold, to form the second coordination scheme group from user terminals having weak radio conditions with respect to all of the base stations as defined by a weak radio condition threshold, and to form the first coordination scheme group from others of the user terminals.

10. A base station for use in a radio communications network comprising a plurality of base stations configured to communicate with a plurality of user terminals in a coordinated way, said base stations comprising at least one grouping circuit configured to group at least some of the user terminals into different coordination scheme groups, the different coordination scheme groups being assigned different coordination schemes in which the base stations coordinate with one another in different ways for communicating with the grouped user terminals, wherein each base station communicates with a user terminal belonging to a particular group using the coordination scheme assigned to that group.

11. A radio communications network comprising a plurality of base stations configured to communicate with a plurality of user terminals in a coordinated way via connections between the base stations, said radio communications network comprising at least one grouping circuit configured to group at least some of the user terminals into different coordination scheme groups, the different coordination scheme groups being assigned different coordination schemes in which the base stations coordinate with one another in different ways for communicating with the grouped user terminals, wherein each base station communicates with a user terminal belonging to a particular group using the coordination scheme assigned to that group.

12. The radio communications network according to claim 11, wherein the base stations are configured to assign orthogonal physical radio resources to each of the different groups.

13. The radio communications network according to claim 12, wherein a physical radio resource comprises of a resource block.

14. A method in a radio network that comprises multiple base stations configured to communicate with multiple user terminals in a coordinated way, the method implemented by a grouping circuit and comprising grouping at least some of the user terminals into different coordination scheme groups, the different coordination scheme groups being assigned different coordination schemes in which the base stations coordinate with one another in different ways for communicating with the grouped user terminals, wherein each base station communicates with a user terminal belonging to a particular group using the coordination scheme assigned to that group.

15. The method according to claim 14, wherein grouping the at least some of the user terminals comprises assigning a user terminal to one of the coordination scheme groups in accordance with at least one of:
the terminal's signalling overhead;
the network's signalling overhead;
an affordable processing complexity;
a traffic load;
a required Quality of Service (QoS); and
a radio condition.

16. The method according to claim 15, wherein grouping the at least some of the user terminals comprises assigning a user terminal to one of the coordination scheme groups in accordance with said radio condition, and wherein the method further comprises determining said radio condition by one of:
a required transmission power level;
a path loss between the user terminal and at least one closest base station;
a terminal reported channel state information; and
an uplink received interference level.

17. The method according to claim 14, further comprising assigning orthogonal physical radio resources to each of the different coordination scheme groups.

18. The method according to claim 14, comprising dynamically grouping the at least some of the user terminals.

19. The method according to claim 14, comprising grouping the at least some of the user terminals into different coordination scheme groups in terms of the required coordination that include a first group requiring multiuser coherent coordination and a second group requiring single user coherent coordination.

20. The method according to claim 19, further comprising grouping the at least some of the user terminals in any given one of the first and second coordination scheme groups into different access groups, each access group comprising one or more user terminals that are to access or be assigned the same set of physical resources.

21. The method according to claim 20, wherein a physical resource comprises of a resource block.

22. The method according to claim 19, further comprising grouping others of the user terminals into a non-coordination scheme group in which the base stations do not coordinate with one another for communicating with the user terminals in that group.

23. The method according to claim 22, further comprising grouping the user terminals in any given one of the different coordination scheme groups or the non-coordination scheme group into different access groups, each access group comprising one or more user terminals that are to access or be assigned the same set of physical resources, wherein said grouping comprises forming each access group to contain only one user terminal if that user terminal belongs to the non-coordination scheme group and to contain one or more users if those one or more users belong to one of the coordination scheme groups.

24. The method according to claim 22, wherein said grouping comprises forming the non-coordination scheme group from user terminals having strong radio conditions with respect to one of the base stations as defined by a strong radio condition threshold, forming the second coordination scheme group from user terminals having weak radio conditions with respect to all of the base stations as defined by a weak radio condition threshold, and forming the first coordination scheme group from others of the user terminals.

* * * * *